United States Patent [19]

Mehki

[11] 4,365,919
[45] Dec. 28, 1982

[54] FREIGHT SECURING APPARATUS

[76] Inventor: Larry L. Mehki, 14385 Cedar St., Monroe, Mich. 48161

[21] Appl. No.: 105,036

[22] Filed: Dec. 19, 1979

[51] Int. Cl.³ .................. B60P 7/10; B60P 7/12; B61D 3/16; B61D 45/00
[52] U.S. Cl. ...................................... 410/120; 410/36; 410/42; 410/47; 410/50
[58] Field of Search .................. 410/2, 36, 37, 38, 44, 410/45, 46, 47, 48, 49, 50, 52, 84, 85, 90, 100, 101, 104, 63, 80, 120, 42; 49/349; 105/362; 222/135; 248/503, 507; 280/5 D, 5 F, 103, 148; 285/137 R, 205; 403/189, 230

[56] References Cited

U.S. PATENT DOCUMENTS

| 230,083 | 7/1880 | Sylvester | 403/230 |
|---|---|---|---|
| 1,014,846 | 1/1912 | Osterander | 105/362 |
| 1,175,312 | 3/1916 | Simpson | 280/103 X |
| 1,231,928 | 7/1917 | Miller et al. | 285/137 R X |
| 1,453,474 | 5/1923 | Mauran | 410/120 X |
| 1,475,012 | 11/1923 | Harris | 49/343 |
| 1,867,271 | 7/1932 | Larsen | 248/503 X |
| 1,897,161 | 2/1933 | Endacott | 280/5 D |
| 2,144,410 | 1/1939 | Ludington | 410/85 |
| 2,226,713 | 12/1940 | Folmsbee | 105/362 |
| 2,298,851 | 10/1942 | Wachter | 410/44 |
| 2,331,416 | 10/1943 | Muller | 410/2 |
| 2,358,537 | 9/1944 | Rose | 280/5 F |
| 2,421,765 | 6/1947 | Taylor | 222/135 |
| 2,603,497 | 7/1952 | Bramann et al. | 105/362 X |
| 2,864,892 | 12/1958 | Perkins | 403/189 X |
| 2,917,267 | 12/1959 | Riddle | 285/205 X |
| 2,942,912 | 6/1960 | Lucas et al. | 410/80 |
| 2,965,886 | 12/1960 | Mitchell | 403/230 X |
| 3,008,731 | 11/1961 | Bombardier | 410/37 |
| 3,197,236 | 7/1965 | Burton | 280/148 X |
| 3,387,813 | 6/1968 | Carino | 410/50 |
| 3,409,157 | 11/1968 | Lull | 410/37 X |
| 3,490,723 | 1/1970 | Atkinson | 410/63 |
| 3,512,739 | 5/1970 | Powell et al. | 410/63 |
| 3,628,466 | 12/1971 | Lyons | 410/49 |
| 3,637,235 | 1/1972 | Karlin et al. | 410/37 |
| 3,851,849 | 12/1974 | Green | 248/507 X |
| 3,865,400 | 2/1975 | Johnson | 410/36 |
| 3,869,152 | 3/1975 | De Vincent et al. | 285/137 R |
| 3,922,004 | 11/1975 | Chamberlain | 410/49 |
| 4,002,316 | 1/1977 | Parchmont | 410/63 |
| 4,010,694 | 3/1977 | Mooney et al. | 410/104 |

FOREIGN PATENT DOCUMENTS

| 194056 | 1/1965 | Sweden | 410/36 |
|---|---|---|---|
| 591975 | 10/1977 | Switzerland | 410/100 |

Primary Examiner—Robert B. Reeves
Assistant Examiner—Howard Beltran
Attorney, Agent, or Firm—Irving M. Weiner; Pamela S. Burt; John L. Shortley

[57] ABSTRACT

A device for automatically stabilizing and holding steel coils to a truck bed. The device can be used for securing differently-sized loads because of its adjustability, and the device does not extend beyond the existing width dimension of the truck bed to any substantial degree. In a first embodiment, a pair of curved members are secured to the load by means of a curved intermediate connecting member. In another embodiment, a pair of pivotal arm members are secured in opposing relation on each side of the truck bed via bracket arrangements. The load-contacting members are adjustable cushioning pads and they have a curved configuration. The devices may be operated manually, hydraulically or pneumatically.

11 Claims, 14 Drawing Figures

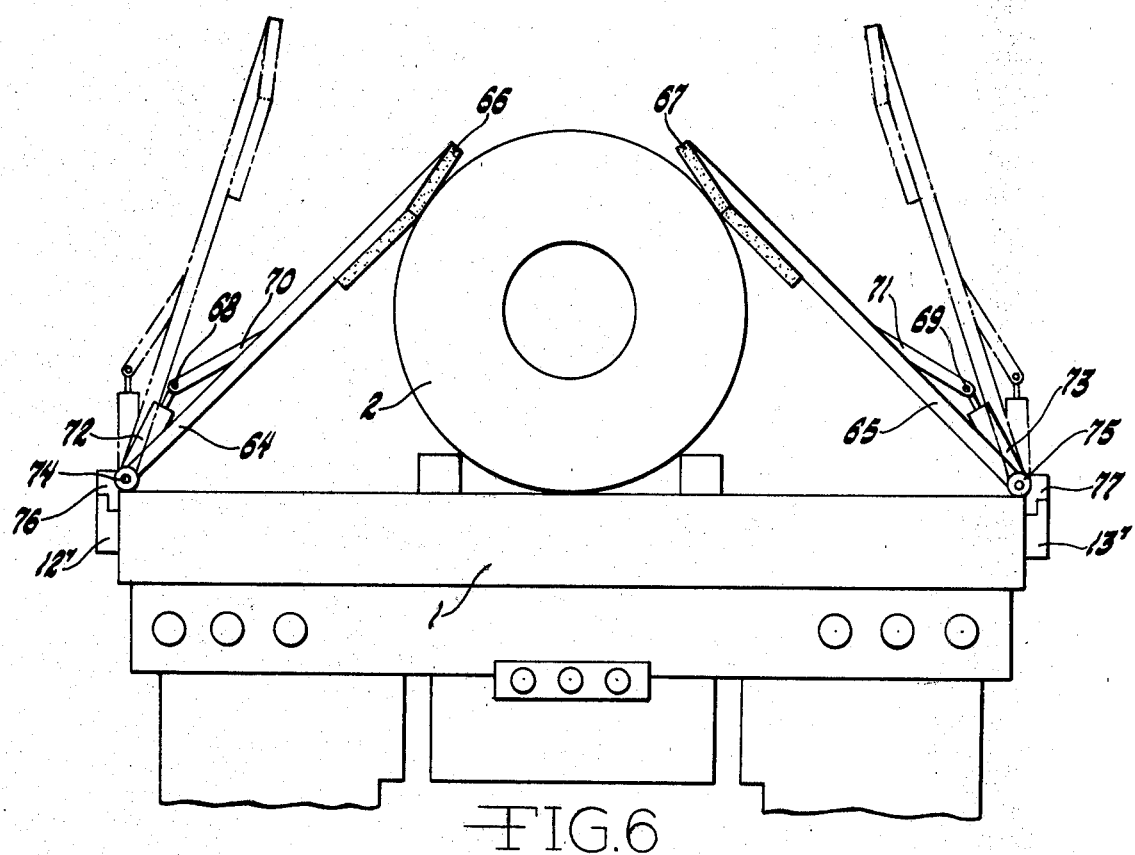
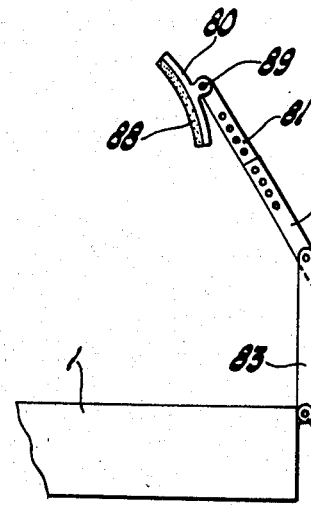
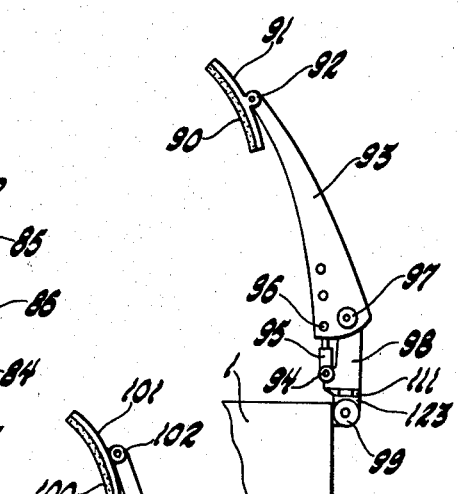
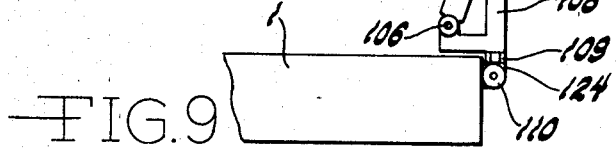
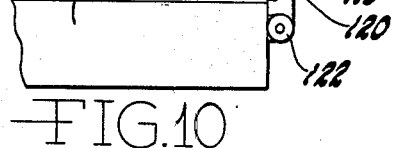

FREIGHT SECURING APPARATUS

BACKGROUND OF THE INVENTION

1. Field of the Invention

The present invention relates generally to various apparatuses for removably securing and stabilizing loads relative to an external structure, particularly when such external structure is movable. The present invention also relates generally to methods for constructing and utilizing the aforesaid apparatuses.

More particularly, the present invention relates to various apparatuses for automatically stabilizing and/or securing various sizes and weights of steel loads, such as coils and stacks of sheet steel, to the bed of a truck. Although certain embodiments of the present invention are particularly suitable for securing cylindrically-shaped coils, the present invention further contemplates use of the inventive apparatuses in conjunction with non-cylindrical loads to be secured to the bed of a truck for transport.

2. Description of Relevant Art

Heretofore, large steel loads were secured to truck beds by various chains and cables. However, such securing devices have proven to be very unsafe, and have resulted in serious and unnecessary damage to the truck, the load, and adjacent vehicles and property when the load-bearing truck made sharp turns, stopped abruptly, tilted to one side, or jack-knifed. Furthermore, various personal injuries and death have been suffered by truck drivers, steel haulers, and other persons near or on such vehicles having heavy loads secured by chains and cables.

Consequently, there developed a desideratum to develop devices which avoided the pitfalls and shortcomings of the cables and chains mentioned hereinabove. Prior to the advent of the present invention, various attempts were made to solve the aforementioned problems. However, none of the prior attempts have resulted in any safe, relatively-inexpensive, nor relatively-uncomplex and strong devices. Such prior attempts are exemplified by the following patents:

In 1912 Allen E. Ostrander was granted U.S. Pat. No. 1,014,846 entitled "ANCHOR FOR TANK-BANDS", which discloses a tank car having a center sill, a cross-bearer, and running boards. Tank band anchors connect the sill to the cross-bearer, and the tank bands terminate in the anchors.

In 1940 Clyde H. Folmsbee was granted U.S. Pat. No. 2,226,713, entitled "TANK CRADLE", which discloses a tank cradle support construction for use with railway tanks for transporting oil. The cradle construction includes an upper plate which is curved to conform to the contour of the lower periphery of the tank shell. The upper plate is secured at its edges to the tank shell itself, and is provided with means for securing the upper plate to an underframe by means of cushioning members. The Folmsbee patent is interesting in that it purports to provide means for securing a cylindrical object on a transportable bed member.

In 1942 Lester W. Wachter was granted U.S. Pat. No. 2,298,851, entitled "TRAILER", which discloses a load-carrying device for a truck or trailer which includes pivotable cradle members provided at spaced locations for supporting the lower periphery of a cylindrical object. Wachter also provides upper strapping members in the form of chains with cushioning members there around which are disposed at opposite sides of the truck or trailer, and which are joined together to secure the upper periphery of the cylindrical object. The chains are joined together by means of a toggle member which provides adjustment of the upper strapping member around the cylindrical object.

In 1952 George M. Bramann et al were granted U.S. Pat. No. 2,603,497, entitled "TANK TRAILER FOR TRANSPORTING GASES", which discloses a carriage structure for transporting chlorine containers. The structure includes a lower cradle member, as well as an upper strapping member. The upper strapping member comprises an adjustable strap which is hinged to angle irons of the lower cradle and is tightened by turning a female threaded member onto a male threaded member by means of a handle.

In 1975 Bruce C. Chamberlain was granted U.S. Pat. No. 3,922,004, entitled "VEHICLE LOAD SECURING DEVICE", which discloses a support device for use on a truck bed that includes pivotally mounted pairs of platforms disposed in two rows along the truck bed. The platforms include a slatted upper member which is adapted to be raised and lowered from the truck bed by means of support arms, with the platforms being disposed in a raised inclined position when supporting the underside of a cylindrical object. Optional lashings may be employed which are attached to lashing points on the edges of the pallets.

In 1977 Harvey O. Parchmont was granted U.S. Pat. No. 4,002,316, entitled "TELESCOPIC SHOCK ABSORBER MOUNT FOR A HYDRAULIC CUSHIONING UNIT IN A RAILWAY CAR TRAILER HITCH", which discloses a collapsible trailer hitch construction for securing a trailer to the deck of a railroad car for piggyback operation. The device includes a cushioning unit provided with shock absorbers which are mountable on a connecting end plate.

The aforesaid specific disclosed arrangements, however, have individually and collectively failed to provide any solution to the above-discussed shortcomings and disadvantages attendant to devices for securing loads to vehicles. Moreover, the present invention eliminates the disadvantages and shortcomings attendant with the conventional and previous techniques, and at the same time provides an apparatus and method which eminently fulfills the desideratum mentioned hereinabove with a minimum of parts and at an extremely surprising reduced cost of manufacture.

SUMMARY OF THE INVENTION

The present invention provides a method and apparatus for securing loads, which is particularly suitable for securing such loads to truck beds. The apparatus includes a first means connected to an external structure, such as a truck bed, having a load thereon. The first means includes adjustable, cushioning load-contacting members. The first means are movable in at least two, and preferably three, mutually-perpendicular planes to facilitate the positioning of at least a portion of the adjustable, cushioning load-contacting members against the load. The apparatus also includes second means for removably, adjustably and tightly securing at least a portion of the adjustable, cushioning load-contacting members against the load, and for removably, adjustably, and tightly securing the load to the external structure.

In another embodiment of the invention, there is provided a method and apparatus for securing loads, particularly to the external structure of a moving vehicle. The apparatus includes first means connected to an external structure, such as a truck bed, having a load thereon. The first means may include two first rigid arcuate members. The two first rigid arcuate members may be pivotable in two mutually-perpendicular planes to facilitate positioning of at least a portion of the two first rigid arcuate members against the load. The apparatus also includes second means for removably, adjustably and tightly securing at least a portion of the two first rigid arcuate members of the first means against the load. The second means includes a second rigid arcuate member which adjustably interconnects the two first rigid arcuate members for removably, adjustably and tightly securing at least a portion of the two first rigid arcuate members against the load, and for removably, adjustably and tightly securing the load against the external structure.

It is an object of the present invention to provide a novel method and apparatus for safely securing cylindrical as well as non-cylindrical objects to the bed of a moving vehicle.

Another object of the invention is to provide a method and apparatus for securing different sized objects or loads, such as steel coils and stacks of flat sheet steel, upon the bed of a moving vehicle.

Yet another object of the invention is to provide a method and apparatus for securing loads to a truck bed, and wherein such apparatuses may be operated manually, hydraulically or pneumatically.

Other objects and advantages of the present invention will appear from the following description and appended claims, reference being had to the accompanying drawings forming a part of this specification wherein like reference characters are intended to designate corresponding parts in the several views.

BRIEF DESCRIPTION OF THE DRAWINGS

FIG. 6 illustrates an elevational view of a third embodiment constituting a modification of the FIG. 5 embodiment.

FIGS. 7 through 10 depict further modifications of the present invention.

DETAILED DESCRIPTION

Before explaining the present invention in detail, it is to be understood that the present invention is not to be limited in its application or uses to the details of construction and arrangement of parts specifically illustrated in the accompanying drawings, because the present invention is capable of other embodiments, variations and modifications, and 4 being practiced or carried out in various ways. Furthermore, it is to be understood that the phraseology or terminology employed herein is for the purpose of description and illustration only, and not for the purpose of limitation or restriction.

Figure 1:
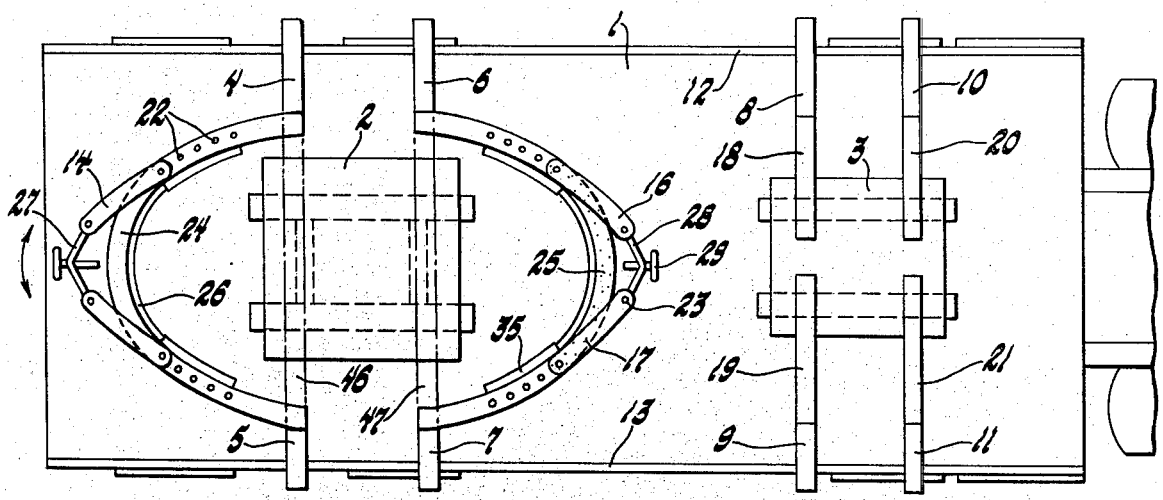
FIG. 1 illustrates a top plan view of a truck bed having thereon a first embodiment of the securing device of the present invention.

With reference to FIG. 1, there is shown a truck bed 1 having two different sized steel coils 2 and 3 carried thereon. According to a first embodiment of the present invention, there is provided base members 4, 5, 6, 7, 8, 9, 10 and 11 which are adjustably or permanently affixed to the truck bed. In a preferred embodiment, such base members can be slidably secured on rails 12 and 13, which in turn are fixedly secured to the truck bed 1.

Figure 2:
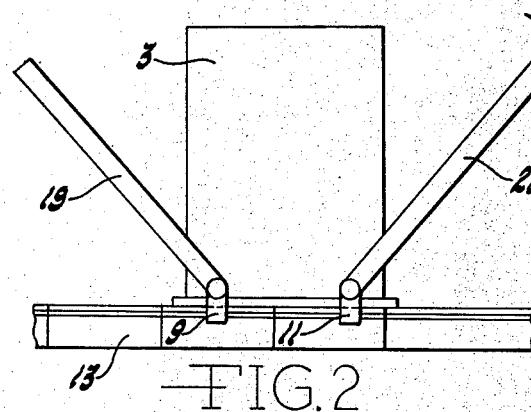
FIG. 2 represents a side elevational view of the apparatus according to the present invention shown on the right portion of FIG. 1 with certain components being omitted merely to illustrate one of the pivotal movements of the apparatus.

Rigid arcuate arms 14, 15, 16, 17, 18, 19, 20 and 21 are movably connected to their associated base members 4, 5, 6, 7, 8, 9, 10 and 11, respectively. Such arcuate arms are pivotably attached to their associated base members by means of conventional universal joints or ball joints so that the arms can pivot or swing parallel to the major central elongated axis of the truck bed, as well as to pivot or swing in a direction which is perpendicular or transverse to such elongated central axis of the truck bed 1. For example, FIG. 2 illustrates a view of the right-hand apparatus of FIG. 1 in an intermediate swinging or pivotal position to show the swinging motion of the arcuate arms generally parallel to the central axis of the truck bed 1.

The base members with their associated arcuate arms 22 constitute adjustable, cushioning load-contacting members. In particular, each of the rigid arcuate arms is provided with a cushioning member or material 35, such as hard rubber, for cushioning the interface between the arcuate arm and the particular load it is securing or stabilizing.

There is also provided an arcuate connecting member 24, 25 each of which is also provided with a cushioning member or material 26, such as hard rubber.

Figure 3:
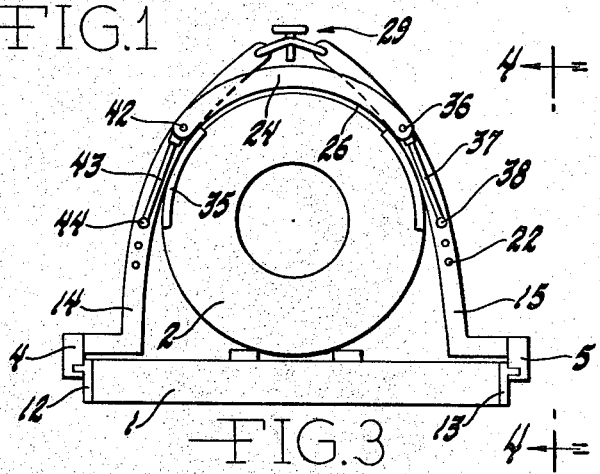
FIG. 3 depicts a vertical elevational view, taken from the rear of the truck bed, showing the first embodiment of the present invention securing a steel coil to the truck bed.
Figure 4:
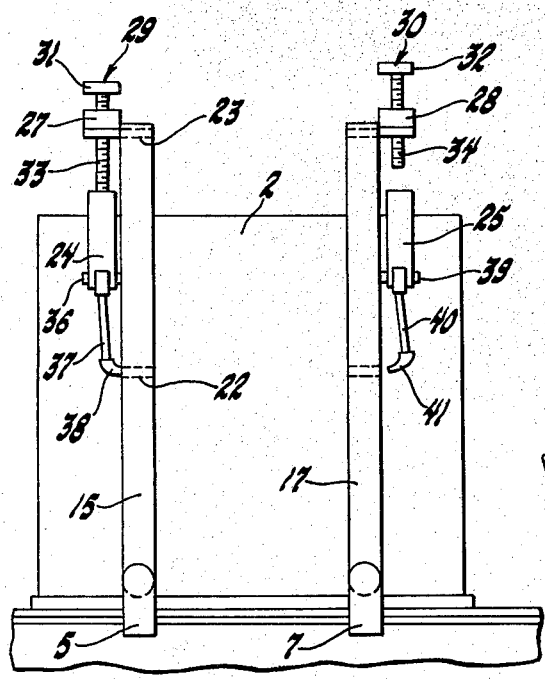
FIG. 4 illustrates a vertical elevational view taken along line 4—4 of FIG. 3 showing one second device in its tightly secured position and showing another second device in its unsecured position.

With reference to FIGS. 1, 3 and 4, an upper connecting cross brace 27 is secured to the top ends of arms 14 and 15 via holes 23, and similarly an upper cross brace 28 is secured to the upper ends of arms 16 and 17 via holes 23. An adjustable screw member 29 is threadedly engaged through cross brace 27, and similarly an adjustable screw member 30 is threadedly engaged through cross brace 28. The function and operation of screw members 29 and 30 will become apparent from the description hereinbelow.

The apparatus in the left-hand portion of FIG. 1 is merely for illustrative purposes only to show the arrangement of parts, but does not reflect the sequence in actual use of the parts of the apparatus. For example, after the steel coil 2 has been placed on the truck bed 1, the rigid arcuate arms would be pivoted and translated into position to bear against the coil or load such as, for example, shown in the right-hand portion of FIG. 1. This can be done with the upper cross brace attached, or alternatively the cross brace can be attached after the arcuate arms are in position bearing against the load.

Thereafter, the connecting member, such as connecting member 25 in the right-hand portion of FIG. 4 would be placed on the top of the coil 2 adjacent the arcuate arms 16 and 17. Connecting member 24 is provided with binders 37 and 43 which are swingably connected to the ends of connecting member 24 by way of pins or bolts 36 and 42, respectively. Binder hooks 38 and 44 depend from the ends of binders 37 and 43, respectively. Similar binders, pins, and binder hooks are connected to the ends of cross member 25 but only binder 40, pin or bolt 39, and binder hook 41 are illustrated in the drawings.

In order for the apparatus to tightly secure the coil 2, the connecting members 24 and 25 should be pressed down tightly so that the binder hooks 38 and 41 can engage the lowermost hole 22 they can reach. The right-hand portion of FIG. 4 shows the relationship of the parts prior to tight securement thereof. The left-hand portion of FIG. 4 shows a similar arrangement of parts but in a position where tight securement has been achieved. In order to assist the user in tightly pressing down the connecting member onto the top of the coil so that the binder hooks may engage the lowermost hole 22, the associated screw member 30 or 29 may be rotated by means of the rotatable handle or cap 32 or 31, respectively, which is integrally secured to threaded screw shafts 34 and 33, respectively. As shown in the upper left-hand portion of FIG. 4, the screw shaft 33 bears down upon the connecting member 24, to tightly compress its associated hard rubber layer 26 and to permit the binder 37 to engage its binder hook 38 in the lowermost hole 22 it can reach. After this has been accomplished, the user can either leave the associated screw member tightly pressing down on its associated connecting member, or in the alternative rotate the screw member in the opposite direction so that the associated shaft no longer contacts the top of the connecting member. When the threaded screw shaft is raised off the top surface of the connecting member so that it no longer contacts same, the resiliency of the hard rubber member 26 urges the connecting member upwardly, but this upward urging or movement is restrained by the fastening arrangement of the binding hook with its associated hole 22. Thus, a very secure tightening tension is generated by use of this novel binding or securing apparatus.

When it is desired to free the load for unloading off the truck bed 1, this process can be facilitated by again bringing the associated screw shaft into contact with the upper portion of its associated connecting member to relieve the aforesaid tightening tension in order to permit and facilitate the removal of binder hooks 38 and 41 from their associated holes 22.

The arms 22 thus are provided with their cushioning members in the load-contacting portions of such arms, and the connecting members are similarly provided with cushioning members or material. In addition, it can be readily seen how the pivoting movements of the arcuate arms in two different planes can be used to accommodate different loads, such as the different sizes of steel coils 2 and 3. Moreover, the translatory motion mentioned hereinabove can be accomplished by way of the extension or adjustable tracts indicated in the left-hand portion of FIG. 1 as tracts 46 and 47 to thus provide adjustability in this third direction, which in effect provides motion in three mutually-perpendicular planes to facilitate positioning of the load-contacting members against the load.

Figure 5:
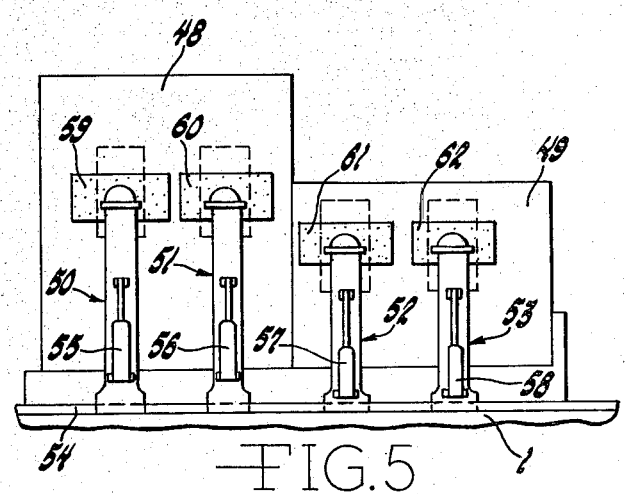
FIG. 5 shows an elevational view of a second embodiment according to the present invention.

FIG. 5 illustrates another embodiment of the invention wherein the novel apparatuses are shown securing or holding different sized loads 48 and 49, such as, for example, steel coils or stacks of flat steel sheets. The figure illustrates four apparatuses 50, 51, 52 and 53 which may be manually, hydraulically or pneumatically actuated and operated. A similar series of apparatuses would be positioned on the opposite side of the loads which are hidden from the viewer of the figure.

The FIG. 5 arrangement shows hydraulic cylinders 55, 56, 57 and 58 for operating associated hydraulic arms or pistons. The upper end of each apparatus is provided with adjustable, and rotatable cushioning pads 59, 60, 61 and 62, respectively. Such pads are shown in a horizontal orientation, but may be easily rotated to the vertical position shown in phantom lines in the Figure.

Furthermore, the apparatuses 50, 51, 52 and 53 may be mounted on a sliding adjustable shaft or rail 54 for positioning relative to and accommodating the securement of various sizes and dimensions of loads.

FIG. 6 shows another modified embodiment wherein rigid and pivotable members 64 and 65 are adjustably connected to truck bed 1 by way of pivot journals 74 and 75, respectively, base members 76 and 77, respectively, and guide rails 12' and 13', respectively. The securing apparatuses may be adjustably positioned along the length of the truck bed 1 by the slidable adjustment of base members 76 and 77 on and in guide rails 12' and 13', respectively.

The load-contacting portions of members 64 and 65 are provided with cushioning pads 66 and 67, respectively, which may be fabricated from any suitable cushioning material, such as for example hard rubber, canvas, etc. The arm members 64 and 65 may be movable and/or adjustable in one, two and/or three mutually-perpendicular planes, as desired.

The members 64 and 65 may be operable manually, hydraulically and/or pneumatically. For example, hydraulic or pneumatic cylinder and piston units 72 and 73 may interconnect the pivot journal 74 and 75, respectively, with pivots 68 and 69, respectively, at the end of link members 70 and 71, respectively. The phantom lined components in FIG. 6 are merely to illustrate one plane of freedom or pivotability to show how various sizes and shapes of load may be accommodated.

FIGS. 7 through 10 show various alternate embodiments for the novel arm members and for different locations thereof relative to the truck bed 1. For brevity, the following explanation will elucidate these configurations with a general description where applicable.

In FIGS. 7 through 10, there is shown cushioning members 88, 90, 100 and 112, fabricated from suitable cushioning material as indicated hereinabove, which are affixed to arcuate load-contacting members 80, 91, 101 and 113, respectively. The devices are permanently, or adjustably and slidably connected to truck bed 1 by way of pivot journals 87, 99, 110 and 122, respectively, with or without slidable guide rails, such as guide rails 12, 13, 12' and 13' as desired. The devices may be hydraulically or pneumatically actuated and operated by way of hydraulic or pneumatic cylinder and piston units 84, 98, 105 and 117, respectively.

In FIG. 7, the member 80 is pivotally connected at pivot 89 to a reach arm 81, which in turn is slidably adjustable relative to main arm 82. Unit 84 is pivotably connected to pivot 86 at the end of arm 82. Link 83 pivotally interconnects pivot journal 87 with intermediate pivot 85 on main arm 82.

In FIG. 8, the member 91 is connected via pivot 92 to an arcuate arm 93, which in turn is connected by way of pivot 97 to a lower arm 98. The hydraulic or pneumatic 94 interconnects arms 93 and 98 via pivots 94 and 96. The pivot journal 99 is connected to a base member 123 which is turn is rotatably connected to lower arm 98 by way of a turning swivel device 111. The device 111 permits rotation of the portions connected thereabove relative to a vertical axis of rotation, and also is provided with a pin locking mechanism for locking the mechanism in any desired rotated position.

In FIG. 9, the member 101 is connected to arm 103 through pivot 102. Arm 103 is connected to lower arm 108 via pivot 107. The hydraulic or pneumatic unit 105 interconnects pivot 106 on lower arm 108 with intermediate pivot 104 on arm 103. Pivot journal 110 is connected to a base member 124, which in turn is rotatably connected to lower arm 108 by way of a swivel device 124 which is similar in construction and purpose to the device 111 explained hereinabove in connection with the FIG. 8 embodiment.

In FIG. 10, the member 113 is connected to main arm 115 by way of a fixed or pivot joint 114. Arm 115 is pivotally connected to lower arm 119 by way of pivot 118. Hydraulic or pneumatic unit 117 interconnects arms 115 and 119 by way of pivots 116 and 125, respectively. Pivot journal 122 is connected to a base member 121, which in turn is rotatably and adjustably connected to lower arm 119 by way of a swivel device 120 which is similar in construction and function to the device 111 explained hereinabove in connection with the FIG. 8 embodiment.

Figure 11:
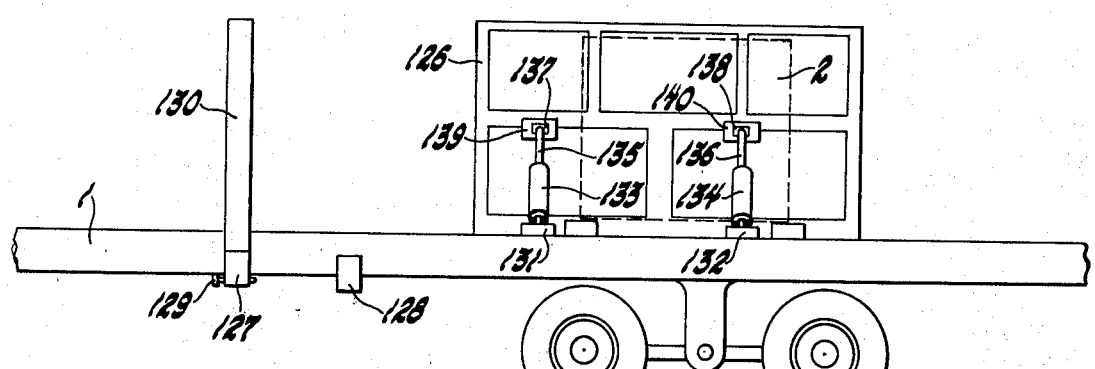
FIG. 11 illustrates a side elevational view of a truck bed having a manual securing bracket thereon as well as another embodiment of the invention used in conjunction with a hydraulic safety gate.

In FIG. 11 there is shown a manually-operable apparatus 133 which is similar in construction and function to the manually-operable apparatuses described in connection with FIGS. 1–4, except for the following explained structure.

In FIG. 11 the truck bed may be provided with a series of spaced pocket devices 128 and 127 disposed along both longitudinal sides of the truck bed 1. These pockets 128 and 127 may be used for positioning and placing the apparatus 130 where desired relative to the location of the load to be secured. For example, the apparatus 130 may be placed within pocket device 127 and retained therein by way of pin 129. A similar pin arrangement can be used for any of the other pockets, such as pocket device 128.

In the right portion of FIG. 11 there is shown a hydraulic gate 126 for holding, stabilizing and securing a load 2, such as a steel coil or stack of sheet material. The hydraulic gate 126 is engaged by adjustable cushioning pads 139 and 140 attached to plate members 137 and 138, respectively. The plate members 137 and 138 are connected to hydraulic or pneumatic units 133 and 134, respectively, by way of piston arms 135 and 136, respectively. The units 133 and 134 are connected to the truck bed 1 by way of base members 131 and 132, respectively.

Figure 12:
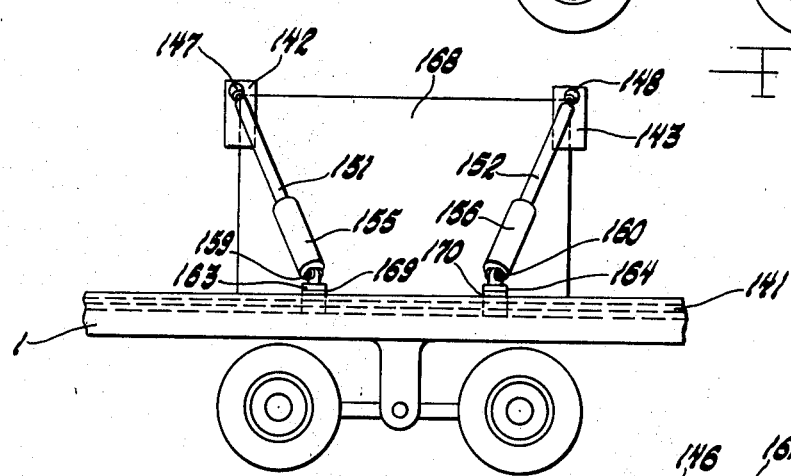
FIG. 12 shows a side elevational view of another embodiment of the present invention mounted on a truck bed.
Figure 13:
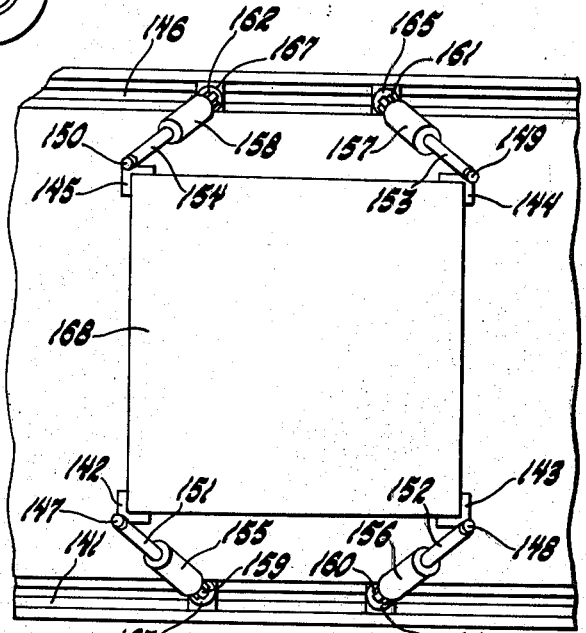
FIG. 13 shows a top plan view of the FIG. 12 embodiment.
Figure 14:
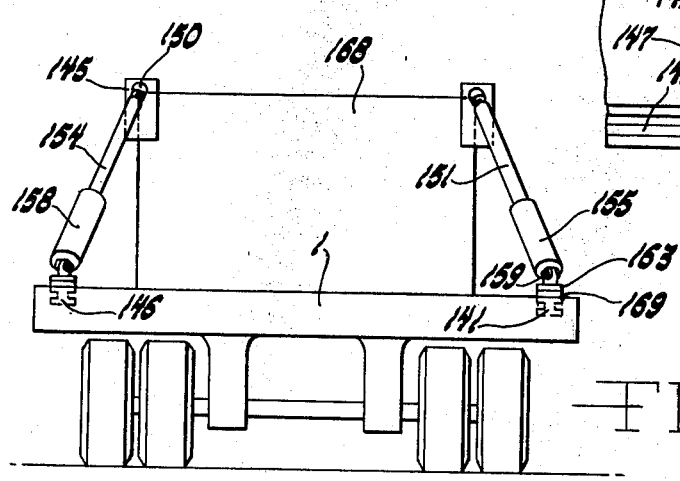
FIG. 14 shows a vertical elevational view of the FIG. 12 embodiment taken from the rear of the truck bed.

With reference to FIGS. 12, 13 and 14, a load 168 in the shape of a rectangular parallelepiped is carried by a truck bed 1. Rails 141 and 146 are disposed along opposite longitudinal portions of the truck bed 1. Base members, such as members 169 and 170, are adjustably and slidably positioned on rails 141 and 146. The members 169 and 170 are rotatably and adjustably connected to swivel brackets 163, 164, 165 and 167. The connection between the base members and swivel brackets provides for lock nut screw shaft type positioning, with a pin for locking in the desired rotary position.

Hydraulic or pneumatic units 155, 156, 157 and 158 are pivotally connected to swivel brackets 163, 164, 165 and 166, respectively, by way of pivot journals 159, 160, 161 and 162, respectively. Adjustable hydraulic piston-arms 151, 152, 153 and 154 pivotally interconnect units 155, 156, 157 and 158, respectively, with special cushioning load-contacting members 142, 143, 144 and 145, respectively, by way of ball joints 147, 148, 149 and 150, respectively.

As best seen in the top plan view of FIG. 13, the special load-contacting members 142, 143, 144, 145 have a L-shaped or 90° dihedral angle for facilitating contact, securement and stability relative to the load 168.

It will also be apparent that various components and devices as described and shown hereinabove may be interchanged for one another. For example, the various apparatuses shown in FIGS. 7–10 may be interchanged for the apparatuses shown in FIG. 6. Furthermore, any of the embodiments mentioned as having permanently or fixed positionings relative to the truck bed 1 may of course be adjustably and slidably positioned relative to truck bed 1 by way of the various rail configurations described hereinabove.

While the invention has been described in conjunction with some preferred embodiments thereof, it will be understood that this description is intended to illustrate and not to limit the scope of the invention, which is defined by the following claims.

I claim:
1. An apparatus for securing loads; comprising:
a structure adapted to vertically support a load;
first means connected to said structure for securing loads to said structure;
said first means including a pair of facing elongated unitary adjustable, cushioning load-contacting members;
each of said members being pivotally mounted on said structure adjacent a lower end of the respective members for movement in a vertical plane extending lengthwise of said structure and for simultaneous movement in an arc-like path with respect to said structure and with respect to the pivotal mounting of said member;
whereby said members can be moved simultaneously upwardly and inwardly with respect to a load carried on said structure;
second means interconnecting and extending between said load-contacting members of said first means for removably, adjustably and tightly securing at least a portion of said adjustable cushioning load-contacting members against a load for removably, adjustably and tightly, securing said load to said external structure;
said second means comprising an elongated element movable lengthwise of at least one of said members and fastenable thereto at locations along the latter member;
adjustable means attachable to at least one of said members for urging said second means along one of said members;
whereby when said members are adjustably positioned with respect to a load carried on said structure, said second means can be urged along at least one of said members and said second means can be attached to the member it is urged along in a posi- tion such as to secure said members tightly against said load and said load against said structure.

2. An apparatus according to claim 1, wherein:
said first means is movable in three mutually-perpendicular planes to facilitate positioning of at least a portion of said adjustable cushioning load-contacting members against said load.

3. An apparatus according to claim 1, including:
a rail member connected to said structure; and
means interconnecting said first means and said rail member for adjustably and slidably positioning said first means relative to said rail member.

4. An apparatus according to claim 1, 2 or 3, wherein:
said adjustable cushioning load-contacting members are pivotable to facilitate any desired positioning of same relative to said load.

5. An apparatus according to claim 1, 2 or 3, wherein:
said second means includes an hydraulic piston and cylinder mechanism for moving said second means along one of said members; and
said structure comprises a truck bed.

6. An apparatus for securing loads, comprising:
first means connected to an external structure having a load thereon;
said first means including two first facing rigid arcuate members;
said two first facing rigid arcuate members each being pivotally mounted on said structure adjacent a lower end of the respective members for movement in a vertical plane extending lengthwise of said structure and for simultaneous movement in an arc-like path with respect to said structure and with respect to the pivotal mounting of said members whereby said members can be moved simultaneously upwardly and inwardly with respect to a load carried on said structure;
second means for removably and tightly securing at least a portion of said two first rigid arcuate members of said first means against said load; and
said second means extending between and interconnecting said two first rigid arcuate members and including a second rigid arcuate member which adjustably interconnects said two first rigid arcuate members for removably, adjustably and tightly securing said load against said external structure.

7. An apparatus according to claim 6, wherein:
said external structure is the bed of a vehicle; and
all portions of said rigid arcuate members which contact said load are provided with cushioning material.

8. An apparatus according to claim 7, including:
a manually-operated screw bearing mechanism removably affixed to the upper ends of said first two rigid arcuate members; and
said screw bearing mechanism being operable and engageable with said second rigid arcuate member to selectively apply and release pressure from the top of said second rigid arcuate member to tightly secure and release, respectively, said second rigid arcuate member from said load.

9. An apparatus according to claim 6, 7 or 8, wherein:
there is provided a rail structure along said external structure; and
means are provided for interconnecting said rail structure to said first means to permit selective and adjustable linear translation of said first means relative to said rail structure.

10. An apparatus according to claim 6, 7 or 8, wherein:
each of said first two rigid arcuate members is provided with a series of adjusting apertures therethrough;
each of the ends of said second rigid arcuate member is provided with a pivotable linking mechanism for engagement with and in said adjusting apertures; and
there is provided a mechanism connected to the upper ends of said two first rigid arcuate members for selectively applying and releasing pressure from the top of said second rigid arcuate member to facilitate coupling of said linking mechanism with said adjusting holes in said first two rigid arcuate members.

11. The apparatus according to claim 10, wherein:
the mechanism connected to the upper ends of said two first rigid arcuate members comprises hydraulic actuating means.

* * * * *